US010409567B2

(12) United States Patent
St. John et al.

(10) Patent No.: US 10,409,567 B2
(45) Date of Patent: Sep. 10, 2019

(54) TRIMMING UNUSED DEPENDENCIES USING PACKAGE GRAPH AND MODULE GRAPH

(71) Applicant: Microsoft Technology Licensing, LLC, Redmond, WA (US)

(72) Inventors: Eric N. St. John, Redmond, WA (US); Livar Correia de Oliveira Cavalcanti Cunha, Woodinville, WA (US); Peter A. Marcu, Redmond, WA (US); Zlatko Knezevic, Seattle, WA (US); Jobst-Immo Landwerth, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/265,630

(22) Filed: Sep. 14, 2016

(65) Prior Publication Data
US 2018/0074819 A1 Mar. 15, 2018

(51) Int. Cl.
*G06F 8/41* (2018.01)
*G06F 8/61* (2018.01)

(52) U.S. Cl.
CPC ............ *G06F 8/433* (2013.01); *G06F 8/4435* (2013.01); *G06F 8/61* (2013.01)

(58) Field of Classification Search
CPC .................................................. G06F 8/00–78
See application file for complete search history.

(56) References Cited

U.S. PATENT DOCUMENTS

| 6,804,682 | B1* | 10/2004 | Kemper | G06F 8/72 |
| 8,407,693 | B2 | 3/2013 | Best et al. | |
| 9,052,982 | B1 | 6/2015 | Ogilvie | |
| 9,069,642 | B2 | 6/2015 | Burckart et al. | |
| 9,122,490 | B2 | 9/2015 | Fanning et al. | |
| 2004/0268302 | A1 | 12/2004 | Srivastava et al. | |
| 2005/0132350 | A1* | 6/2005 | Markley | G06F 8/65 717/168 |
| 2009/0013315 | A1* | 1/2009 | Sharma | G06F 8/75 717/159 |
| 2010/0083211 | A1* | 4/2010 | Poole | G06F 8/71 717/101 |
| 2011/0283268 | A1 | 11/2011 | Salter | |

(Continued)

OTHER PUBLICATIONS

Roman Liutikov, "Dead code elimination and tree-shaking in JavaScript build systems", https://medium.com/@roman01la/dead-code-elimination-and-tree-shaking-in-javascript-build-systems-fb8512c86edf, Published Dec. 21, 2015.*

(Continued)

*Primary Examiner* — Chameli Das
*Assistant Examiner* — Joanne G Macasiano
(74) *Attorney, Agent, or Firm* — Wade IP Law LLC

(57) ABSTRACT

Techniques are described herein that are capable of trimming unused dependencies using a package graph and a module graph. For instance, the package graph and the module graph may be traversed to determine whether dependencies of an application are used during execution of the application. A version of the application may be configured to include the dependencies that are used and to not include the dependencies that are not used. For instance, the version of the application may be configured to be utilized at deployment time.

21 Claims, 6 Drawing Sheets

(56) References Cited

U.S. PATENT DOCUMENTS

| | | | | |
|---|---|---|---|---|
| 2014/0096110 | A1* | 4/2014 | Charters | G06F 8/70 717/120 |
| 2015/0074633 | A1* | 3/2015 | Slack | G06F 8/75 717/101 |
| 2015/0355993 | A1* | 12/2015 | Hwang | G06F 9/449 714/38.1 |
| 2016/0019071 | A1 | 1/2016 | Webb et al. | |

OTHER PUBLICATIONS

DNF Command Reference—Auto Remove Command, https://dnf.readthedocs.io/en/latest/command_ref.html, Archived May 2, 2016, Retrieved Apr. 27, 2019 (Year: 2016).*

Remove unused packages, https://unix.stackexchange.com/questions/40179/rennove-unused-packages, see question and related responses from Jul. 13, 2014 to Sep. 13, 2016. Retrieved Apr. 27, 2019 (Year: 2016).*

"Shrink Your Code and Resources", Retrieved on: Aug. 5, 2016, 7 pages, Available at: https://developer.android.com/studio/build/shrink-code.htm.

Jiang, et al., "JRed: Program Customization and Bloatware Mitigation Based on Static Analysis", In Proceedings of 40th IEEE Computer Society International Conference on Computers, Software & Applications, Jun. 10, 2016, 10 pages.

Carter, et al., "Reducing Package Dependencies with project.json", Retrieved on: Aug. 5, 2016, 4 pages, Available at: https://docs.microsoft.com/en-us/dotnet/articles/core/deploying/reducing-dependencies.

"Remove Unused References", Retrieved on: Aug. 5, 2016, 2 pages, Available at: https://www.jetbrains.com/help/resharper/2016.1/Refactorings__Remove_Unused_References.html.

"ResolveUR—Resolve Unused References", Retrieved on: Aug. 5, 2016, 2 pages, Available at: https://visualstudiogallery.msdn.microsoft.com/fe96c042-9a83-4fa2-921d-6b09aa044315.

Yu, et al., "Removing False Code Dependencies to Speedup Software Build Processes", In Proceedings of the conference of the Centre for Advanced Studies on Collaborative research, Oct. 6, 2003, pp. 1-10.

"Oracle® Solaris 11.2 Linkers and Libraries Guide", Published on: Jul. 2014, 486 pages, Available at; https://docs.oracle.com/cd/E36784_01/html/E36857/glmvc.html.

"Runtime Directives (rd.xml) Configuration File Reference" Retrieved on: Aug. 11, 2016, 12 pages, Available at: https://msdn.microsoft.com/en-us/library/dn600639(v=vs.110).aspx.

Petrusha, Ron, ".NET Core Application Deployment," Published on: Sep. 10, 2016, 26 pages, Available at: https://docs.microsoft.com/en-us/dotnet/articles/core/deploying/index#self-contained-applications.

* cited by examiner

Solid: package dependency
Dash: static module dependency
Dot: dynamic module dependency

TRIMMING UNUSED DEPENDENCIES USING PACKAGE GRAPH AND MODULE GRAPH

BACKGROUND

Tree-shaking is a process in which unused portions of an application are removed (a.k.a. trimmed) from the application at deployment time. Unused portions on which other portions depend are referred to as "dependencies" of the other portions. Removing the unused portions may reduce a size of the deployed application. A variety of techniques has been proposed for removing unused portions of an application for deployment. However, each such technique has its limitations.

In one example, native compilers may statically analyze libraries linked into a single module of an application and eliminate code that is not called by the application. However, such native compilers often are incapable of handling dynamic references. Moreover, merging code into a single module may eliminate the identity of the shared module, which may hinder (e.g., prevent) the module from being shared between multiple applications and/or from being serviced outside the application.

In another example, some pre-compilers (e.g., .NET Native™) are configured to compile applications directly to native code. Such pre-compilers statically analyze the applications to determine which code is called. The pre-compilers typically merge the code into a single module in a similar manner to the native compilers mentioned above. However, unlike the native compilers, the pre-compilers often use heuristics to identify dynamic references. However, the heuristics usually are incomplete. If the heuristics fail to identify dynamic references, a developer often devotes time and resources to learn a new concept in order to communicate dynamic dependencies (rd.xml).

SUMMARY

Various approaches are described herein for, among other things, trimming unused dependencies using a package graph and a module graph. A dependency is an item on which another item depends. Examples of an item include but are not limited to a package, a module, a class, and a method. It will be recognized that a package includes one or more modules; a module includes one or more classes; and a class includes one or more methods. In one example, an application programming interface (API) or a group of APIs may be a dependency. In another example, an API may be included in a dependency.

A package graph specifies packages that are included in an application. The package graph may also specify modules that are included in any one or more of the packages. The package graph may specify package references. A package reference references a package. For non-limiting illustrative purposes, the packages may be described as nodes of the package graph, and the package references may be described as edges of the package graph.

A module graph specifies modules that are included in an application. The module graph may specify module references. A module reference references a module. For non-limiting illustrative purposes, the modules may be described as nodes of the module graph, and the module references may be described as edges of the module graph.

The example embodiments are capable of traversing a package graph and a module graph to determine whether dependencies of an application are used during execution of the application. The example embodiments may configure a version of the application to include the dependencies that are used and to not include the dependencies that are not used. For instance, the version of the application may be configured to be utilized at deployment time.

In an example approach, a traversal of a package graph is initiated. The package graph specifies packages that are included in a first version of an application that is utilized at compile time of the application. The traversal of the package graph is started at package root(s) that are included in the packages. A traversal of a module graph is initiated. The module graph specifies modules that are included in the first version of the application. The traversal of the module graph is started at module root(s) that are included in the modules. A distinction is made between a first subset of the packages, which is encountered during the traversal of the package graph, and a second subset of the packages, which is not encountered during the traversal of the package graph. A distinction is made between a first subset of the modules, which is encountered during the traversal of the module graph, and a second subset of the modules, which is not encountered during the traversal of the module graph. A second version of the application to be utilized at deployment time of the application is configured. The second version of the application includes the first subset of the packages and not the second subset of the packages. The second version of the application includes the first subset of the modules and not the second subset of the modules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
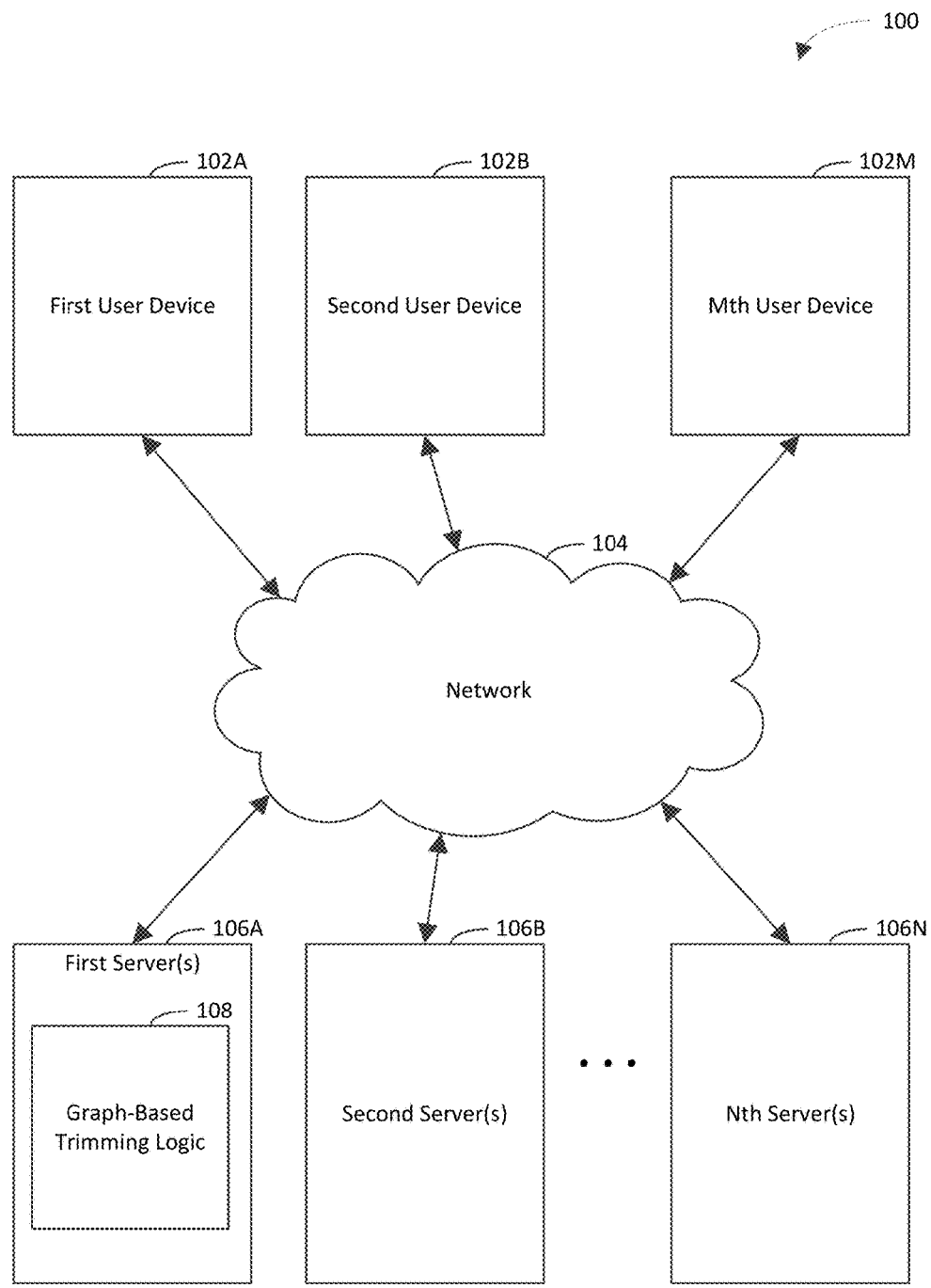
FIG. 1 is a block diagram of an example graph-based trimming system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of trimming unused dependencies using a package graph and a module graph. A dependency is an item on which another item depends. Examples of an item include but are not limited to a package, a module, a class, and a method. It will be recognized that a package includes one or more modules; a module includes one or more classes; and a class includes one or more methods. The example embodiments may perform inter-module tree-shaking in addition to or in lieu of intra-module tree shaking. It is noted that walking classes and methods in accordance with an intra-module tree-shaking technique may be relatively expensive. Accordingly, the example embodiments may be implemented without walking classes and methods (e.g., without walking static dependencies between classes and members thereof). The example embodiments are capable of leveraging information that a compiler has already learned and bringing the end result into a module reference table. In one example, an application programming interface (API) or a group of APIs may be a dependency. In another example, an API may be included in a dependency.

A package graph specifies packages that are included in an application. The package graph may also specify modules that are included in any one or more of the packages. The package graph may specify package references. A package reference references a package. For non-limiting illustrative purposes, the packages may be described as nodes of the package graph, and the package references may be described as edges of the package graph.

A module graph specifies modules that are included in an application. The module graph may specify module references. A module reference references a module. For non-limiting illustrative purposes, the modules may be described as nodes of the module graph, and the module references may be described as edges of the module graph.

The example embodiments are capable of traversing a package graph and a module graph to determine whether dependencies of an application are used during execution of the application. The example embodiments may configure a version of the application to include the dependencies that are used and to not include the dependencies that are not used.

Example techniques described herein have a variety of benefits as compared to conventional techniques for trimming dependencies. For instance, the example techniques may be capable of exposing all available packages and modules of an application at compile time and limiting exposure at deployment time to exclude those packages and modules that are not used by the application. Trimming of unused packages and modules may be performed on module boundaries, which may enable identity of modules to be preserved. The example techniques may be integrated in the normal developer lifecycle and leverage known information regarding dependencies. For instance, dynamic dependencies may be communicated naturally through package references and direct binary references (e.g., of which a developer of the application may already be aware). Dynamic references may be preserved in package dependencies through redistributed packages, naturally, by packaging a library with its explicit dependencies. The example techniques may apply the same trimming operation to the development build of an application and to the release build of the application. The example techniques may not require test execution and/or may involve no tracing. The example techniques may involve no feedback loop from runtime of the application back to development.

The example techniques may increase user efficiency (e.g., by reducing a number of steps that a user takes and/or an amount of effort that the user expends to trim unused dependencies from an application). For instance, using a package graph and a module graph to trim unused dependencies may reduce (e.g., eliminate) a need for a user to manually trim unused dependencies, which may reduce difficulty and/or a number of errors associated with identifying used dependencies. The user need not necessarily align versions of the application, determine which versions support others, etc.

The example techniques may reduce (e.g., eliminate) a need for a user to understand a tree-shaking algorithm and/or granularity of technologies that are used by the application. The user need not necessarily author a specific format (e.g., file format) to guide the tree-shaking algorithm in order to identify used dependencies. The user need not necessarily perform actions that are unrelated to the application in order to trim unused dependencies. The example techniques may reduce an amount of time that is consumed to transfer bits of the application via a wired or wireless communication path, restart the application during development thereof, etc. The example techniques may reduce a size of the application on disk. The example techniques may enable a library developer to control a dependency graph associated with a library to ensure that items other than those needed by the library are not included in the dependency graph, which may help the library developer avoid influencing the dependency graph of an upstream customer. Thus, trimming may be performed on package dependencies during a packaging operation in addition to or in lieu of the output of the publish operation.

The example techniques may be capable of reducing an amount of time and/or resources (e.g., processor, memory, network bandwidth) of a computing system that is used to facilitate trimming of unused dependencies. The example techniques may increase efficiency of a computing system that is used to facilitate trimming of unused dependencies.

FIG. 1 is a block diagram of an example graph-based trimming system 100 in accordance with an embodiment. Generally speaking, graph-based trimming system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, graph-based trimming system 100 trims unused dependencies using a package graph and a module graph. Detail regarding techniques for trimming unused dependencies using a package graph and a module graph is provided in the following discussion.

As shown in FIG. 1, graph-based trimming system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of graph-based trimming system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include graph-based trimming logic 108 for illustrative purposes. Graph-based trimming logic 108 is configured to trim unused dependencies using a package graph and a module graph. Graph-based trimming logic 108 initiates a traversal of a package graph. The package graph specifies packages that are included in a first version of an application that is utilized at compile time of the application. Graph-based trimming logic 108 starts the traversal of the package graph at package root(s) that are included in the packages. Graph-based trimming logic 108 initiates a traversal of a module graph. The module graph specifies modules that are included in the first version of the application. Graph-based trimming logic 108 starts the traversal of the module graph at module root(s) that are included in the modules. Graph-based trimming logic 108 distinguishes between a first subset of the packages, which is encountered during the traversal of the package graph, and a second subset of the packages, which is not encountered during the traversal of the package graph. Graph-based trimming logic 108 distinguishes between a first subset of the modules, which is encountered during the traversal of the module graph, and a second subset of the modules, which is not encountered during the traversal of the module graph. Graph-based trimming logic 108 configures a second version of the application to be utilized at deployment time of the application. The second version of the application includes the first subset of the packages and not the second subset of the packages. The second version of the application includes the first subset of the modules and not the second subset of the modules.

It will be recognized that a root may be any suitable type of root and may be received from any suitable source. A relatively simple application (e.g., a console application) may have a single module output, which may be one module group. A web application may have a module output for the main routine and have a module output for views that go through a view compiler. A different compiler produces a different module, but it is still a part of the application. In that way, there are many sources for the module roots. Package roots may be directly communicated by the build assets (e.g., project file or make file) of the application.

It will be recognized that graph-based trimming logic 108 may include any of a variety of functionalities for building a computer program, including but not limited to source control, static code analysis, dynamic code analysis, compilation, linking, extraction, loading, etc.

Source control involves managing changes to a computer program (a.k.a. an application). For instance, each time a change is made to the computer program, a revision number associated with the computer program may be incremented; a timestamp indicating a time at which the change was made may be stored; an indicator that specifies a person who made the change may be recorded, etc.

Static code analysis involves analyzing the computer program for information, including but not limited to module dependencies, package dependencies, API dependencies, comments, unit tests, duplication, complexity, potential bugs, and/or adherence to coding rules, without executing the computer program.

Dynamic code analysis involves determining information, such as the information mentioned above with respect to static code analysis, by executing the computer program.

In accordance with example embodiments described herein, a combination of static code analysis and dynamic code analysis may be utilized to facilitate trimming unused dependencies using a package graph and a module graph.

Compilation involves transforming source code of the computer program into code of another language (e.g., executable code or intermediate code). For instance, the computer program may be compiled from a relatively higher-level programming language (e.g., C or C++) to a relatively lower-level language (e.g., assembly language or machine code). The source code may be compiled into object files, which are relocatable format machine code. The compiled computer program may be persisted to disk for subsequent processing.

Linking involves combining the code that results from compilation (e.g., object files) into a single executable computer program.

Extraction involves receiving (e.g., retrieving) information (e.g., data, computer program code, etc.) from a store for processing. For instance, precompiled headers may be extracted from a store during compilation of a computer program.

Loading involves storing information (e.g., executable code of a computer program) in main memory of one or more processing systems (e.g., any one or more of user systems 102A-102M and/or servers 106A-106N). For instance, such information may be copied from disk to the main memory. Loading may further involve performing preparatory operations to prepare executable code of the computer program for running. Examples of a preparatory operation include but are not limited to validating permissions, memory requirements, etc. associated with the computer program; copying command-line arguments on the stack; initializing registers, such as the stack pointer; jumping to the entry point of the computer program, etc.

It will be further recognized that graph-based trimming logic 108 may be (or may be included in) a developer tool, though the scope of the example embodiments is not limited in this respect. Example techniques for trimming unused dependencies using a package graph and a module graph are discussed in greater detail below with reference to FIGS. 2-7.

Graph-based trimming logic 108 may be implemented in various ways to selectively trim unused dependencies using a package graph and a module graph, including being implemented in hardware, software, firmware, or any combination thereof. For example, graph-based trimming logic 108 may be implemented as computer program code configured to be executed in one or more processors. In another example, graph-based trimming logic 108 may be implemented as hardware logic/electrical circuitry. For instance, graph-based trimming logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Graph-based trimming logic 108 is shown to be incorporated in first server(s) 106A for illustrative purposes and is not intended to be limiting. It will be recognized that graph-based trimming logic 108 (or any portion(s) thereof) may be incorporated in any one or more of the user systems 102A-102M. For example, client-side aspects of graph-based trimming logic 108 may be incorporated in one or more of the user systems 102A-102M, and server-side aspects of graph-based trimming logic 108 may be incorporated in first server(s) 106A. In another example, graph-based trimming logic 108 may be distributed among the user systems 102A-102M. In yet another example, graph-based trimming logic 108 may be incorporated in a single one of the user systems 102A-102M. In another example, graph-based trimming logic 108 may be distributed among the server(s) 106A-106N. In still another example, graph-based trimming logic 108 may be incorporated in a single one of the server(s) 106A-106N.

It may be desirable to expose the greatest number of application programming interfaces (APIs) possible at compile time so that a developer need not search for APIs. It may be further desirable to configure a version of the application to be used at deployment time that includes only those APIs (or groups thereof) that are used so that application size is relatively small. A group of APIs may be capable of being referenced as a group (e.g., with a single reference) in addition to or in lieu of the APIs in the group being capable of being individually referenced. A technique in which the application is trimmed solely based on static binary references may not be sufficient because such a technique does not capture dynamic references. Accordingly, graph-based trimming logic 108 may use a combination of static module references and package references to determine a set of files to be used by the application at deployment time. Graph-based trimming logic 108 may expose the greatest number of APIs possible to a developer at design/compile time without requiring the developer to understand component factoring and/or to explicitly reference components. Examples of a component include but are not limited to a package and a module. Graph-based trimming logic 108 may configure a version of the application to be used at deployment time that does not include components that are not used by the application at runtime. Configuring the version of the application in this manner may enable the application to have a relatively small size.

Graph-based trimming logic 108 may construct two (or more) graphs of packages and modules, which may be combined (e.g., inter-related) to provide a combined graph. The packages may include modules. Each package references the modules that the package includes. Each module references the package(s) in which the module is included.

Graph-based trimming logic 108 may group packages into meta-packages for convenient referencing. For instance, rather than the developer manually listing individual dependencies when the developer starts writing an application, the developer may reference a meta-package that includes those dependencies. With this one dependency, the developer may begin writing the application, which may reduce a concept count that the developer handles. At least one package in the meta-package may reference one or more other packages in the meta-package. Rather than deploying the entire closure of the meta-package, trimming on publish may allow the published application to be as small as possible.

From a developer's perspective, utilization of meta-packages may simplify development an application because the developer may use one reference to the meta-package in order to obtain access to the packages therein. When the developer produces an output (e.g., when the developer wants the application to go into production or on a server or somewhere else), the developer may receive all of the packages, even if the developer is not using some of them, unless the developer uses a tree-shaking technique, such those described herein. Even if a tree-shaking technique is employed, the developer may still reference the one meta-package, the developer receives only the dependencies (e.g., packages and modules) that the developer uses.

Graph-based trimming logic 108 may classify each of the packages and the modules as "trimmable" or "not-trimmable." Graph-based trimming logic 108 may classify the meta-packages as trimmable. Graph-based trimming logic 108 may treat non-essential modules as trimmable. Meta-packages and non-essential modules may be specified as arguments to an algorithm that is executed by graph-based trimming logic 108 to trim unused dependencies in accordance with technique(s) described herein. It should be noted that graph-based trimming logic 108 may enable packages to opt-in to trimmable classification. By default, graph-based trimming logic 108 may consider only meta-packages as trimmable. Roots may be communicated as input to the algorithm. A module root may be the module being built and any other direct module references (e.g., project references). Package roots may be the packages directly referenced by the project being built, excluding trimmable packages. In addition to these defaults, additional roots may be specified.

To start, graph-based trimming logic 108 may consider all packages and modules as trimmed. Starting from the specified roots, graph-based trimming logic 108 may traverse the combined graph. From each node in the combined graph, both packages and modules are traversed. Modules that are encountered are considered to be not-trimmed. The traversal stops at each trimmable module or package. Such trimmable module or package remains trimmed and is not traversed. The traversal also stops at each module or package that is already considered to be not-trimmed. In this way, the output of the project may be trimmed to the set of packages and modules that are directly referenced. It should be noted that if a package is trimmable, determining that the application references the package does not necessarily mean that all of the dependencies of the package are to be included in the trimmed version of the application. Those dependencies may be included only if referenced directly as roots or indirectly through some other rooted package or module with no trimmable node in the path. If a dependency is missing, the developer may naturally add a reference to that dependency, making the dependency a root, and the dependency and all of its dependencies may be included in the output of the project.

It should be noted that the developer may opt-in or opt-out of the trimming experience (e.g., by controlling an interface element on a display). Moreover, the developer may opt-in a package or module to be classified as "non-trimmable" to ensure that the package or module is included in the published output regardless what an algorithm used by graph-based trimming logic 108 detects. The developer may desire to instantiate a type in a dynamic form (e.g., via reflection). For example, the developer may be loading a physical dynamic-link library (DLL) into an application. In accordance with this example, graph-based trimming logic 108 may designate the DLL as a package or treat the DLL as a file system artifact (e.g., similar to content that is present in the output folder).

Graph-based trimming logic 108 may determine dependencies of an application in any of a variety of ways. For example, the application includes metadata. A "module reference" table of the metadata indicates which components are referenced by the application. Names of the component are listed in the modules of the application. By referring to the module reference table, graph-based trimming logic 108 is able to determine which components the application must have in order to run. The application also includes byte code in a well-defined, strongly typed table, referred to as an "assembly reference" table, indicating which components are used by the application. For non-limiting illustrative purposes, the assembly reference table may be similar to an import table of a native DLL. In this example, the application and the components are the same technology (e.g., .NET assemblies).

In another example, the application may reference native dependencies through a DLL import attribute. Graph-based trimming logic 108 is capable of discovering such native dependencies.

In yet another example, input/output (I/O) instructions may be analyzed to identify calls to known loading APIs (e.g., assembly .load files). Graph-based trimming logic 108 may find a literal string that is passed into a loader API and then directly identify the loader API as a dependency. A loader API may be buried deep in the stack in a component. The literal string that controls the loader API may be high in the application. Without performing data flow analysis or real-time execution and tracing, a fool-proof view of these types of dependencies may not be available. Also, if a module name is received from an external source, such as a data file that the application can load (e.g., a web page), the data may not be found. It is possible to identify a loader API that is capable of supporting any dynamic component, but have no way of knowing which component the loader API is to use. In such case, other techniques may be used to determine dependencies of the application.

Figure 2:
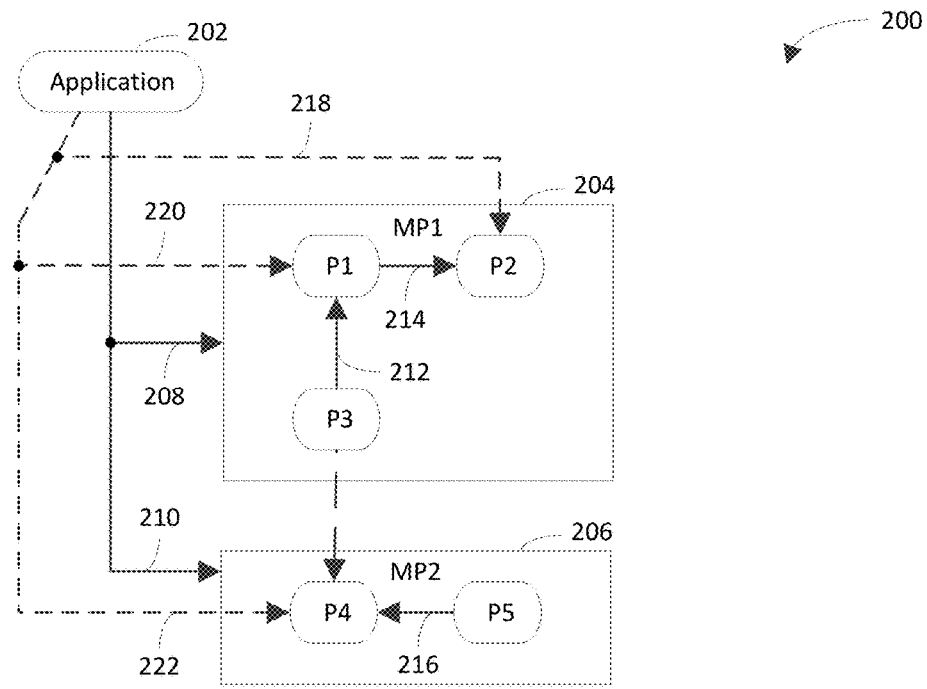
FIGS. 2-3 depict block diagrams of example package graphs in accordance with embodiments.
Figure 3:
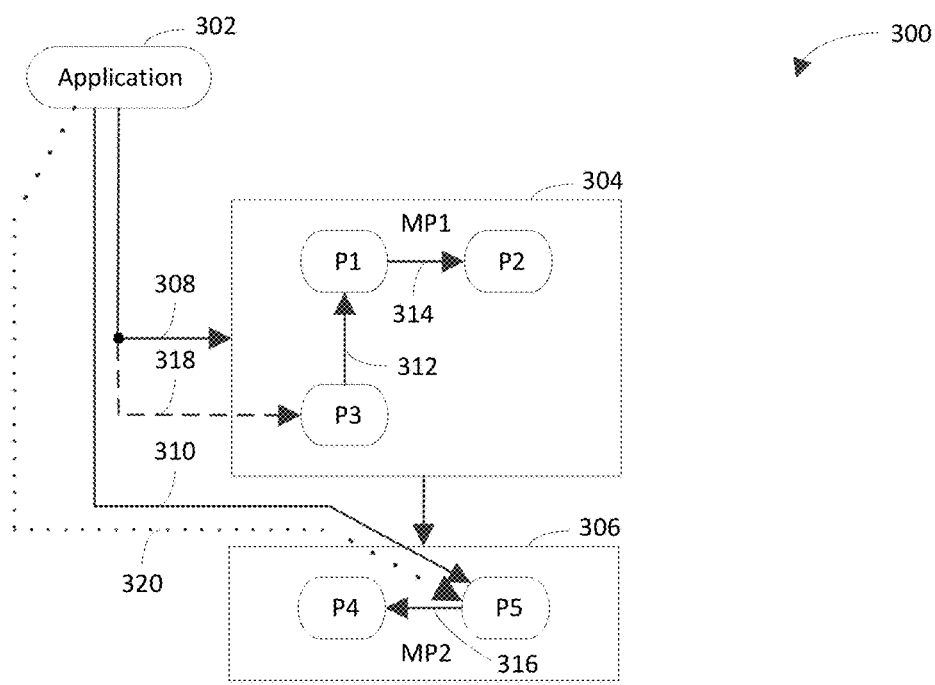

FIGS. 2-3 depict block diagrams of example package graphs 200 and 300 in accordance with embodiments. In the discussion of FIGS. 2-3, solid lines represent package dependencies; dashed lines represent static module dependencies; and dotted lines represent dynamic module dependencies. Referring to FIG. 2, package graph 200 depicts an application 202, a first meta-package 204 (referred to as "MP1"), and a second meta-package 206 (referred to as "MP2"). First meta-package 204 includes packages P1, P2, and P3. Second meta-package 206 includes packages P4 and P5. Application 202 is shown to reference first meta-package 204 and second meta-package 206, as represented by arrows 208 and 210, respectively. P3 references P1, as represented by arrow 212. P1 references P2, as represented by arrow 214. P5 references P4, as represented by arrow 216.

A tree-trimming technique as described herein may be used to walk packages in application 202. Dependencies of the packages may be determined by reviewing a package manifest, for example. The package manifest may include a list of the dependencies of the packages. Package graph 200 may be constructed to enable a view into first and second meta-packages 204 and 206. Accordingly, even though the application 202 references first meta-package 204, including packages P1, P2, and P3, a determination may be made that application 202 references only P1 in first meta-package 204 and that P1 references only P2. Thus, a determination may be made that application 202 uses P1 and P2 and does not use P3. A determination may be made that application 202 references only P4 in second meta-package 206 and that P4 does not reference any other packages. Thus, a determination may be made that application 202 uses P4 and does not use P5. Traversing package graph 200 may reveal that P1, P2, and P4 are to be included in a version of application 202 that is to be utilized at deployment and that P3 and P5 are not to be included. Accordingly, P3 and P5 are trimmed from the aforementioned version of application 202. Arrows 218, 220, and 222 represent module references from the application 202 to the modules contained in P1, P2, and P4.

Referring to FIG. 3, package graph 300 depicts an application 302, a first meta-package 304 (referred to as "MP1"), and a second meta-package 306 (referred to as "MP2"). First meta-package 304 includes packages P1, P2, and P3. Second meta-package 306 includes packages P4 and P5. Application 302 is shown to reference first meta-package 304 and P5, which is included in second meta-package 306, as represented by arrows 308 and 310, respectively. P3 references P1, as represented by arrow 312. P1 references P2, as represented by arrow 314. P5 references P4, as represented by arrow 316.

Arrow 318 represents a static dependency of application 302 on P3. Application 302 has a dynamic dependency on P5, as represented by arrow 320. A determination may be made that application 302 is missing P5. A reference from application 202 to P5 may therefore be create, as represented by arrow 310. Creating this reference may enable P5 to be included in the output directory once application 202 is built. P4 will automatically be included in the build of application 202 because creating the reference to P5 "rooted" P5, and rooting P5 causes all of the dependencies of P5 to be included in the build even though application 202 does not reference P4.

Creating the reference to P5 and including P4 and P5 in the build is a natural way for the developer to opt-in to this light-up (i.e., dynamic) technology in a straight-forward and intuitive way without having to consider that trimming is occurring. The developer may merely add a reference, which automatically causes P4 and P5 to be included in the build. There is no additional concept count for the developer to handle. Moreover, the developer gets the same output in development and in production. While developing, the developer may debug the code on the developer's machine. The code that the developer debugs is the same code that is in production.

Tree-shaking often is part of a linking stage, which is fairly expensive due to long wait times. However, using the example techniques described herein enable information from artifacts that are relatively cheap to read to be obtained. Accordingly, the tree-shaking functionality described herein may be present continuously without a substantial performance impact (e.g., due to resource consumption associated with the tree-shaking functionality). If dependencies are missed, it will become immediately evident.

Figure 4:
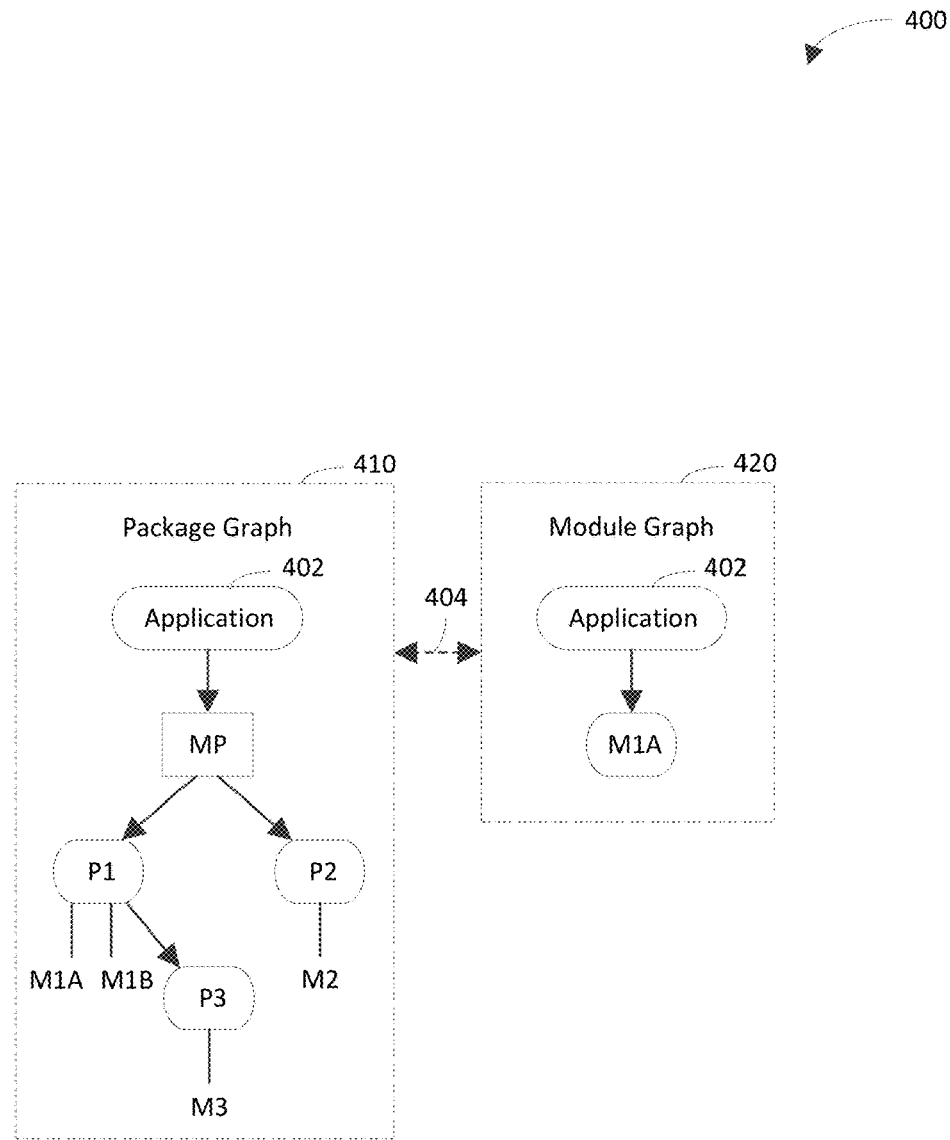
FIG. 4 depicts a block diagram of an example inter-related graph in accordance with an embodiment.

FIG. 4 depicts a block diagram of an example inter-related graph 400 in accordance with an embodiment. Referring to FIG. 4, inter-related graph 400 includes a package graph 410 and a module graph 420. Package graph 410 and module graph 420 are inter-related, as represented by arrow 404, such that a traversal of inter-related graph 400 may flow between package graph 410 and module graph 420. Each of package graph 410 and module graph 420 depicts an application 402. Package graph 410 further depicts a meta-package MP, which is trimmable, and packages P1, P2, and P3. Module graph 420 further depicts a module M1A. In package graph 410, application 402 is shown to reference MP. MP references P1 and P2. P1 references P3. P1 includes modules M1A and M1B. P2 includes module M2. P3 includes module M3. In module graph 420, application 402 is shown to reference M1A.

A traversal of inter-related graph 400 may be performed by alternately traversing portions of package graph 410 and module graph 420. For instance, an incremental traversal of module graph 420 reveals that application 402 references M1A. In package graph 410, MP is trimmable and therefore is not traversed. In response to the incremental traversal of the module graph 420 revealing M1A, as described above, P1 is pushed into the traversal queue of the package graph 410 and treated as a root because P1 includes M1A. Treating P1 as a root means that P1 and its closure are to be included in a version of application 402 that is to be utilized at deployment time. The closure of P1 includes M1A and M1B because P1 includes M1A and M1B, P3 because P1 references P3, and M3 because P3 includes M3. Encountering P3 and M3 will now be described with regard to the alternately traversing technique mentioned above.

Following the incremental traversal of package graph 410, a second incremental traversal of module graph 420 provides no further information because M1A has no dependencies (e.g., does not reference any modules). Thereafter, a second incremental traversal of package graph 410 reveals that P1 references P3. The second incremental traversal of package graph 410 further reveals that P3 includes M3. Because P1 is not trimmable, package graph 410 indicates that P1 references P3, and P3 is not trimmable, a determination can be made that P3 is to be included in the aforementioned version of application 402. A determination can be made that M3 is to be included in the aforementioned version of application 402 because P3 includes M3. The last package (i.e., P3) in package graph 410 has now been processed, and the last package has no package dependencies. Thus, the traversal comes to an end.

The traversal of inter-related graph 400 therefore reveals that the aforementioned version of application 402 is to include M1A, P1, M1B, P3, and M3. The traversal further reveals that the aforementioned version of application 402 is not to include P2 and M2 because P2 and M2 were not encountered during the traversal.

It should be noted that when a traversal of an inter-related graph (e.g., inter-related graph 400) begins, it is possible that the package graph, which is included in the inter-related graph, includes no package roots. For instance, the traversal may begin without a package root if the application has not specified any package roots. Nevertheless, the graph walk may be iterative. Each time a node is encountered, the node's children may be included in the version of the application for deployment. A node's children may be all the same type (e.g., all modules or all packages). The traversal may start at module root(s). The children of the module root(s) are modules, which are considered for the next iteration of the graph walk. For instance, the traversal may continue at package(s) that include the children of the module root(s).

Utilizing the example techniques described herein may cause the development experience and the deployment experience to be the same. Two application models may be employed. In a first application model, dependencies are published locally. In a second application model, a manifest file represents dependencies, and only the dependencies listed in the manifest file are used. Using the manifest at development time may speed up development. If copies are performed at development time, disk I/O may slow down development. The example techniques may feed into the copy step that would happen on a publish and the creation of the manifest that is used for execution during debug time.

The example techniques described herein are applicable to any domain that may be represented as a graph and related to the final form of an application. For example, assume that graph (A) represents the application's final form (in this example, modules; in another example, an application module and a manifest). Further assume that graph (B) represents a user-friendly model of the same. In accordance with this example, nodes in graph B have a relationship to nodes in graph A. Roots in the domain of graph B may be used to extend a trimming algorithm of graph A. Similarly, multiple graphs C, D, and E ad infinitum can be used in the same manner, so long as those graphs have a relationship to graph A.

Any suitable policy may be utilized for classification of nodes at "trimmable" or "not trimmable." In one example, each package on a dependency may classify the dependency arc as trimmable or not trimmable, which may enable the package to interact with a tree-trimming algorithm as described herein and decide whether or not the package is to be included in or excluded from (or optionally included in) a version of the application. In one example policy, individual package nodes may be identified as trimmable or not trimmable by name, and modules are not classified as trimmable by name. In another example policy, modules may be classified as trimmable based on metadata on the modules discovered through static analysis, and/or packages may be classified as trimmable based on an attribute in the package manifest indicating that the packages are trimmable.

The example embodiments may be implemented by classifying arcs (a.k.a. edges), rather than nodes of a graph. For instance, in first context, it may be desirable for a package to be trimmable. In another context, it may be desirable for the package to be not trimmable. To enable such flexibility, an arc associated with the package may be classified, using an attribute on the package dependency in the depending package or project's manifest. If the package itself were classified as trimmable, the package may always be trimmed.

For illustrative purposes, assume that a component dynamically depends on a platform-specific item, such as Windows Registry APIs which are not present on other operating systems. The registry may not always be needed. However, when the registry is available, it may be desirable to include the registry. Accordingly, an arc associated with the registry may be classified as trimmable. It will be recognized that classification of arcs may be performed in addition to or in lieu of classification of nodes or not at all.

Figure 5:
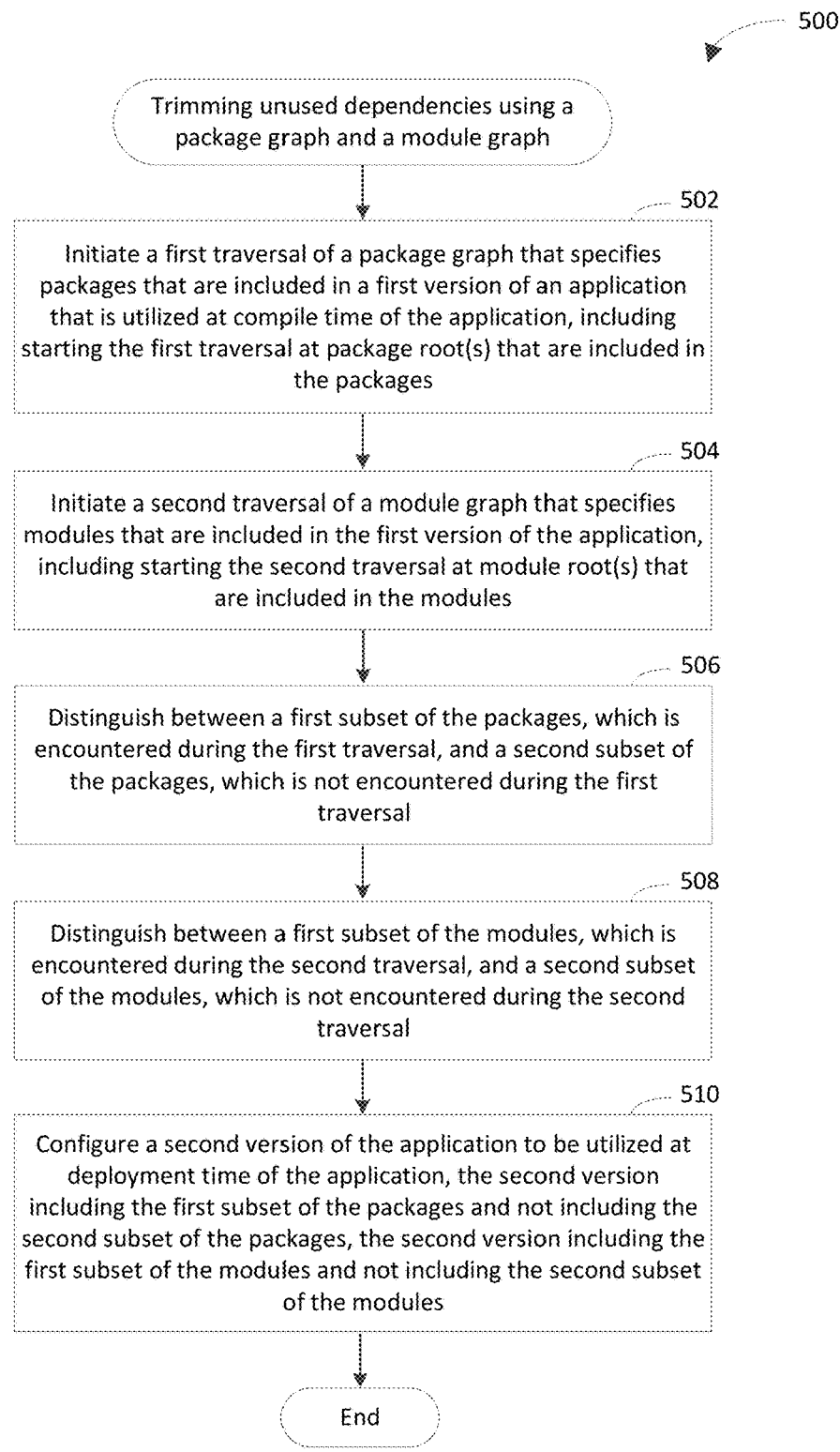
FIG. 5 depicts a flowchart of an example method for trimming unused dependencies using a package graph and a module graph in accordance with an embodiment.
Figure 6:
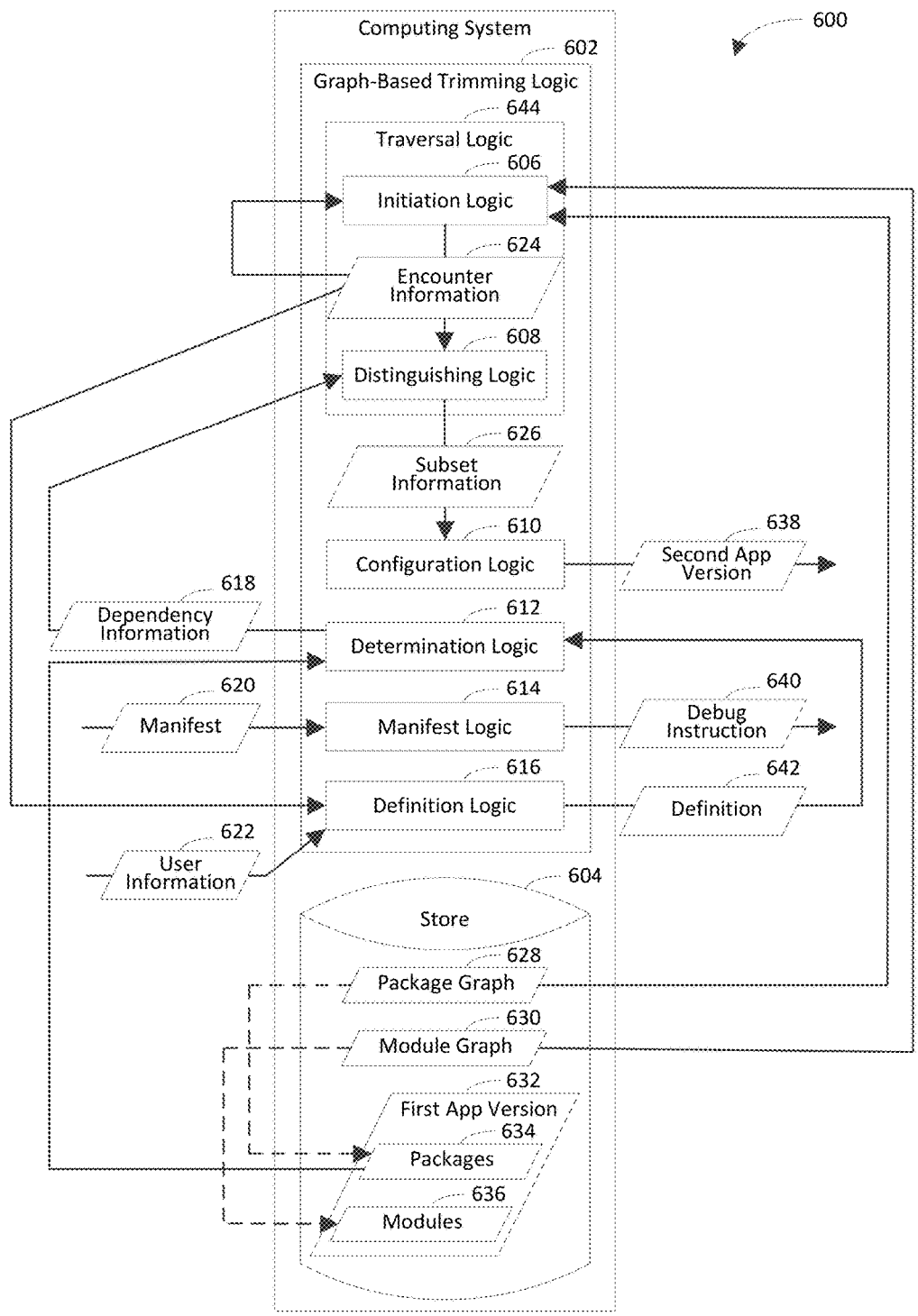
FIG. 6 is a block diagram of an example computing system in accordance with an embodiment.

FIG. 5 depicts a flowchart 500 of an example method for trimming unused dependencies using a package graph and a module graph in accordance with an embodiment. Flowchart 500 may be performed by graph-based trimming logic 108 shown in FIG. 1, for example. For illustrative purposes, flowchart 500 is described with respect to a computing system 600 shown in FIG. 6. Computing system 600 may include one or more of user systems 102A-102M, one or more of server(s) 106A-106N, or any combination thereof, though the scope of the example embodiments is not limited in this respect. Computing system 600 includes graph-based trimming logic 602 and a store 604. Graph-based trimming logic 602 includes traversal logic 644, configuration logic 610, determination logic 612, manifest logic 614, and definition logic 616. Traversal logic 644 includes initiation logic 606 and distinguishing logic 608. Further structural and operational embodiments will be apparent to persons skilled in the relevant art(s) based on the discussion regarding flowchart 500.

As shown in FIG. 5, the method of flowchart 500 begins at step 502. In step 502, a first traversal of a package graph is initiated. The package graph specifies packages that are included in a first version of an application that is utilized at compile time of the application. Initiating the first traversal includes starting the first traversal at package root(s) that are included in the packages. In an example implementation, initiation logic 606 initiates a first traversal of a package graph 628. The package graph 628 specifies packages 634 that are included in a first app version 632, which is the first version of the application. In accordance with this implementation, initiation logic 606 starts the first traversal at the package root(s), which are included in the packages 634. Initiation logic 606 may generate encounter information 624 to indicate which of the packages 634 are encountered during the first traversal and/or which of the packages 634 are not encountered during the first traversal.

In an aspect of this implementation, store 604 stores the package graph 628, a module graph 630, and the first app version 632. In accordance with this aspect, initiation logic 606 may receive (e.g., collect or retrieve) the package graph 628 from store 604. Store 604 may be any suitable type of store. One type of store is a database. For instance, store 604 may be a relational database, an entity-relationship database, an object database, an object relational database, an extensible markup language (XML) database, etc.

At step 504, a second traversal of a module graph is initiated. The module graph specifies modules that are included in the first version of the application. Initiating the second traversal includes starting the second traversal at module root(s) that are included in the modules. In an example implementation, initiation logic 606 initiates a second traversal of a module graph 630. For instance, initiation logic 606 may receive (e.g., collect or retrieve) the module graph 630 from store 604. The module graph 630 specifies modules 636 that are included in the first app version 632. In accordance with this implementation, initiation logic 606 starts the second traversal at the module root(s), which are included in the modules 636.

Initiation logic 606 may generate encounter information 624 to indicate (e.g., specify) which of the modules 636 are encountered during the second traversal and/or which of the modules 636 are not encountered during the second traversal. For example, initiation logic 606 may combine package indicators and module indicators to provide the encounter information 624. In accordance with this example, the package indicators may indicate which of the packages 634 are encountered during the first traversal and/or which of the packages 634 are not encountered during the first traversal. In further accordance with this example, the module indicators may indicate which of the modules 636 are encountered during the second traversal and/or which of the modules 636 are not encountered during the second traversal.

The package graph 628 and the module graph 630 may have a relationship. For instance, the package graph 628 and the module graph 630 may be inter-related and/or interconnected. For example, one or more of the packages 634, which are specified by the package graph 628, may reference one or more of the modules 636, which are specified by the module graph 630. In another example, one or more of the modules 636 may be included in one or more of the packages 634.

It will be recognized that the package root(s), which are included in the packages 634, and the module root(s), which are included in the modules 636, may be communicated naturally. For example, any one or more of the package root(s) and/or the module root(s) may be communicated via the application itself. In another example, any one or more of the package root(s) may be communicated via direct package reference(s) of a project of a developer. In yet another example, any one or more of the module root(s) may be communicated via direct module references of a project of a developer.

At step 506, a distinction is made between a first subset of the packages, which is encountered during the first traversal, and a second subset of the packages, which is not encountered during the first traversal. In an example implementation, distinguishing logic 608 distinguishes between a first subset of the packages 634, which is encountered during the first traversal, and a second of the packages 634, which is not encountered during the first traversal. For example, distinguishing logic 608 may make the distinction in response to receipt of the encounter information 624. In accordance with this example, distinguishing logic 608 may make the distinction based at least in part on the encounter information 624 indicating which of the packages 634 are encountered during the first traversal and/or which of the packages 634 are not encountered during the first traversal. Distinguishing logic 608 may generate subset information 626 to indicate which of the packages 634 are to be included in the first subset of the packages 634 and/or which of the packages 634 are to be included in the second subset of the packages 634.

At step 508, a distinction is made between a first subset of the modules, which is encountered during the second traversal, and a second subset of the modules, which is not encountered during the second traversal. In an example implementation, distinguishing logic 608 distinguishes between a first subset of the modules 366, which is encountered during the second traversal, and a second of the modules 636, which is not encountered during the second traversal. For example, distinguishing logic 608 may make the distinction in response to receipt of the encounter information 624. In accordance with this example, distinguishing logic 608 may make the distinction based at least in part on the encounter information 624 indicating which of the modules 636 are encountered during the second traversal and/or which of the modules 636 are not encountered during the second traversal. Distinguishing logic 608 may generate subset information 626 to indicate which of the modules 636 are to be included in the first subset of the modules 636 and/or which of the modules 636 are to be included in the second subset of the modules 636.

In an aspect of this implementation, distinguishing logic 608 may generate package subset information to indicate which of the packages 634 are to be included in the first subset of the packages 634 and/or which of the packages 634 are to be included in the second subset of the packages 634. In accordance with this aspect, distinguishing logic 608 may generate module subset information to indicate which of the modules 636 are to be included in the first subset of the modules 636 and/or which of the modules 636 are to be included in the second subset of the modules 636. In further accordance with this aspect, distinguishing logic 608 may combine the package subset information and the module subset information to provide the subset information 626.

In an example embodiment, distinguishing between the first subset of the packages and the second subset of the packages at step 506 includes finding packages that are "rooted." In accordance with this embodiment, distinguishing between the first subset of the modules and the second subset of the modules at 508 includes finding modules that are "rooted." In step 506, when examining packages that are "rooted," all modules that are included in those packages may be identified. The modules that are identified are considered "rooted," and those rooted modules feed back into the traversal of the module graph (at step 508). In step 508, all packages that include the rooted modules may be identified. The packages that include the rooted modules are considered "rooted," and those rooted packages feed back into the traversal of the package graph (at step 506).

At step 510, a second version of the application is configured to be utilized at deployment time of the application. The second version includes the first subset of the packages and does not include the second subset of the packages. The second version includes the first subset of the modules and does not include the second subset of the modules. In an example implementation, configuration logic 610 configures a second app version 638, which is the second version of the application, to be utilized at deployment time of the application. In accordance with this implementation, the second app version 638 includes the first subset of the packages 634 and does not include the second subset of the packages 634. In further accordance with this implementation, the second app version 638 includes the first subset of the modules 636 and does not include the second subset of the modules 636.

For example, configuration logic 610 may configure the second app version 638 to be utilized at deployment time of the application in response to receipt of the subset information 626. In accordance with this example, configuration logic 610 may configure the second app version 638 to be utilized at deployment time of the application based at least in part on the subset information 626 indicating which of the packages 634 are to be included in the first subset of the packages 634 and/or which of the packages 634 are to be included in the second subset of the packages 634 and/or which of the modules 636 are to be included in the first subset of the modules 636 and/or which of the modules 636 are to be included in the second subset of the modules 636.

In an example embodiment, configuring the second version of the application at step 510 includes copying the first subset of the modules at publish time of the application. In accordance with this embodiment, configuring the second version of the application at step 510 further includes not copying the second subset of the plurality of modules at publish time of the application.

In another example embodiment, configuring the second version of the application at step 510 includes generating a manifest that specifies a set of packages and a set of modules to be logically included in the application at debug time of the application. The set of packages includes the first subset of the packages and does not include the second subset of the packages. The set of modules includes the first subset of the modules and does not include the second subset of the modules.

In yet another example embodiment, configuring the second version of the application at step 510 includes configuring the second version of the application to be utilized at deployment time of the application in a development environment and at deployment time of the application in a production environment.

In still another example embodiment, the module graph does not specify a designated module that is included in the first version of the application. In accordance with this embodiment, configuring the second version of the application includes configuring the second version of the application to include the designated module based at least in part on the designated module being included in at least one package that is included in the first subset of the packages.

In some example embodiments, one or more steps 502, 504, 506, 508, and/or 510 of flowchart 500 may not be performed. Moreover, steps in addition to or in lieu of steps 502, 504, 506, 508, and/or 510 may be performed. For instance, in an example embodiment, the method of flowchart 500 includes alternately performing incremental portions of the first traversal and incremental portions of the second traversal to distinguish between the first subset of the packages and the second subset of the packages and to further distinguish between the first subset of the modules and the second subset of the modules. For example, the package graph and the module graph may be traversed in parallel (e.g., simultaneously). In accordance with this example, a first incremental portion of the module graph may be traversed during a first period of time; a first incremental portion of the package graph may be traversed during a second period of time that follows the first period of time; a second incremental portion of the module graph may be traversed during a third period of time that follows the second period of time; a second incremental portion of the package graph may be traversed during a fourth period of time that follows the third period of time, and so on. In an example implementation, initiation logic 606 may initiate each of the incremental portions of the first traversal at corresponding rooted packages and each of the incremental portions of the second traversal at corresponding rooted modules.

In an example implementation, initiation logic 606 alternately performs the incremental portions of the first traversal and the incremental portions of the second traversal to enable distinguishing logic 608 to distinguish between the first subset of the packages 634 and the second subset of the packages 634 and to distinguish between the first subset of the modules 636 and the second subset of the modules 636.

In an aspect of this embodiment, a specified incremental portion of the first traversal is based at least in part on a first module that is encountered during a specified incremental portion of the second traversal. The modules that are specified by the module graph include the first module.

In an example implementation of this aspect, alternately performing the incremental portions of the first traversal and the incremental portions of the second traversal includes initiating the specified incremental portion of the first traversal at a designated package, which is included in the first subset of the packages, based at least in part on the designated package including the first module.

In another example implementation of this aspect, a designated incremental portion of the second traversal, which is performed in response to the specified incremental portion of the first traversal, is based at least in part on a designated module in the first subset of the modules being included in a designated package that is encountered during the specified incremental portion of the first traversal. The first subset of the packages includes the designated package.

In an example of this implementation, alternately performing the incremental portions of the first traversal and the incremental portions of the second traversal includes initiating the designated incremental portion of the second traversal at the designated module based at least in part on the designated module being included in the designated package.

In yet another example implementation of this aspect, a designated incremental portion of the first traversal is based at least in part on a second module that is encountered during a designated incremental portion of the second traversal. In accordance with this implementation, the modules that are specified by the module graph include the second module. In further accordance with this implementation, the first module references the second module in the module graph.

In another example embodiment, the method of flowchart 500 further includes determining that a designated module of the plurality of modules is a dynamic dependency of the first version of the application. For example, determination logic 612 may determine that the designated module is a dynamic dependency of the first app version 632. Determination logic 612 may generate dependency information 618 in response to determining that the designated module is a dynamic dependency of the first app version 632. The dependency information 618 may specify that the designated module is a dynamic dependency of the first app version 632.

In accordance with this embodiment, distinguishing between the first subset of the modules and the second subset of the modules at step 508 includes including (e.g., automatically including) the designated module and other module(s), which are dependencies of the designated module and which are not referenced by the first version of the application, in the first subset of the modules (e.g., in response to determining that the designated module is a dynamic dependency of the first version of the application). For example, distinguishing logic 608 may include the designated module and the other module(s), which are dependencies of the designated module and which are not referenced by the first app version 632, in the first subset of the modules 636. In accordance with this example, distinguishing logic 608 may include the designated module and the other module(s) in the first subset of the modules 636 in response to receipt of the dependency information 618. For instance, distinguishing logic 608 may include the designated module and the other module(s) in the first subset of the modules 636 based at least in part on the dependency information 618 specifying that the designated module is a dynamic dependency of the first app version 632.

In yet another example embodiment, the method of flowchart 500 further includes performing the first traversal of the package graph and the second traversal of the module graph without utilizing feedback from runtime of the application to development of the application.

In still another example embodiment, the method of flowchart 500 further includes utilizing a manifest that indicates the first subset of the packages and not the second subset of the packages and that further indicates the first subset of the modules and not the second subset of the modules at debug time of the application. For example, manifest logic 614 utilizes a manifest 620 that indicates the first subset of the packages 634 and not the second subset of the packages 634 and that further indicates the first subset of the modules 636 and not the second subset of the modules 636 at debug time of the application. In accordance with this example, manifest logic 614 may receive the manifest 620 from distinguishing logic 608. For instance, distinguishing logic 608 may generate the manifest 620 in response to distinguishing between the first subset of the packages 634 and the second subset of the packages 634 and further in response to distinguishing between the first subset of the modules 636 and the second subset of the modules 636.

In an aspect of this embodiment, the manifest may be utilized at debug time of the application to determine that the first subset of the packages and the first subset of the modules are to logically be in the application at runtime and that the second subset of the packages and the second subset of the modules are not to logically be in the application at runtime. In accordance with this aspect, manifest logic 614 may generate a debug instruction 640 to initiate debugging of the application having the first subset of the packages and the first subset of the modules logically therein and not having the second subset of the packages and the second subset of the modules logically therein.

In another aspect of this embodiment, the manifest may be utilized in lieu of copying the modules that are included in the first subset of the modules.

In yet another aspect of this embodiment, utilizing the manifest at debug time of the application may reduce an amount of time consumed to develop the application.

In another example embodiment, the method of flowchart 500 further includes defining a meta-package, which is a user-identifiable container that references the packages that are included in the first version of the application, to be trimmable to enable the meta-package to be excluded from the second version of the application. For example, definition logic 616 may define the meta-package, which is a user-identifiable container that references the packages 634 that are included in the first app version 632, to be trimmable to enable the meta-package to be excluded from the second app version 638. In accordance with this example, definition logic 616 may generate a definition 642 that defines the meta-package.

In yet another example embodiment, the method of flowchart 500 further includes initially defining the packages to be in a trimmed state to indicate that the packages are not to be included in the second version of the application. For example, definition logic 616 may initially define the packages 634 to be in the trimmed state to indicate that the packages 634 are not to be included in the second app version 638. In accordance with this example, definition logic 616 may generate the definition 642 to define the packages 634 to be in the trimmed state.

In accordance with this embodiment, the method of flowchart 500 further includes selectively changing a state of each package in at least a subset of the packages from the trimmed state to an untrimmed state depending on whether the respective package is encountered during the first traversal of the package graph. The untrimmed state indicates that the respective package is to be included in the second version of the application. The subset of the packages includes one or more (e.g., all) of the packages.

In one example, definition logic 616 may selectively change the state of each package in at least a subset of the packages 634 from the trimmed state to the untrimmed state depending on whether the respective package is encountered during the first traversal of the package graph 628. For example, definition logic 616 may selectively change the state of each package in at least the subset of the packages 634 in response to receipt of the encounter information 624. In accordance with this example, definition logic 616 may change the state of each package in the first subset of the packages 634 from the trimmed state to the untrimmed state based at least in part on the encounter information 624 indicating that each package in the first subset of the packages 634 is encountered during the first traversal of the package graph 628. In further accordance with this example, definition logic 616 may not change the state of each package in the second subset of the packages 634 from the trimmed state to the untrimmed state based at least in part on the encounter information 624 indicating that each package in the second subset of the packages 634 is not encountered during the first traversal of the package graph 628. In accordance with this example, definition logic 616 may update the definition 642 to indicate that each package in at least the subset of the packages 634 that is encountered during the first traversal of the package graph 628 is in the untrimmed state.

In still another example embodiment, the method of flowchart 500 further includes converting a specified package that is specified by the package graph from a default state in which the specified package is non-trimmable such that the specified package is not capable of being excluded from the second version of the application to an updated state in which the specified package is trimmable to enable the specified package to be excluded from the second version of the application, in response to receipt of a user instruction specifying that the specified package is to be trimmable. For example, definition logic 616 may convert the specified package, which is specified by the package graph 628, from the default state in which the specified package is non-trimmable such that the specified package is not capable of being excluded from the second app version 638 to an updated state in which the specified package is trimmable to enable the specified package to be excluded from the second app version 638, in response to receipt of a user instruction 622 specifying that the specified package is to be trimmable. In accordance with this example, definition logic 616 may generate the definition 642 to indicate that the specified package is in the default state. In further accordance with this example, definition logic 616 may update the definition 642 to indicate that the specified package is converted to the updated state in response to the user instruction 622 instructing that the specified package is to be trimmable.

In another example embodiment, the method of flowchart 500 further includes converting a designated module that is specified by the module graph 630 from a default state in which the designated module is non-trimmable such that the designated module is not capable of being excluded from the second version of the application to an updated state in which the designated module is trimmable to enable the designated module to be excluded from the second version of the application, in response to receipt of a user instruction specifying that the designated module is to be trimmable. For example, definition logic 616 may convert the designated module, which is specified by the module graph 630, from the default state in which the designated module is non-trimmable such that the designated module is not capable of being excluded from the second app version 638 to an updated state in which the designated module is trimmable to enable the designated module to be excluded from the second app version 638, in response to receipt of a user instruction 622 specifying that the designated module is to be trimmable. In accordance with this example, definition logic 616 may generate the definition 642 to indicate that the designated module is in the default state. In further accordance with this example, definition logic 616 may update the definition 642 to indicate that the designated module is converted to the updated state in response to the user instruction 622 instructing that the designated module is to be trimmable.

In yet another example embodiment, the method of flowchart 500 further includes determining that a specified package that is specified by the package graph is configured to be non-trimmable such that the specified package is not capable of being excluded from the second version of the application. For example, determination logic 612 may determine that the specified package that is specified by the package graph 628 is configured to be non-trimmable such that the specified package is not capable of being excluded from the second app version 638. In accordance with this example, determination logic 612 may make the determination in response to receipt of the definition 642. For instance, determination logic 621 may make the determination based at least in part on the definition 642 indicating that the specified package is in a non-trimmable state.

In accordance with this embodiment, the method of flowchart 500 further includes identifying dependencies of the specified package. For example, distinguishing logic 608 may identify the dependencies of the specified package. Distinguishing logic 608 may generate the subset information 626 to indicate the dependencies of the specified package.

In further accordance with this embodiment, configuring the second version of the application includes configuring the second version of the application to include the dependencies of the specified package in addition to the specified package based at least in part on the specified package being configured to be non-trimmable. For example, configuration logic 610 may configure the second app version 638 to include the dependencies of the specified package in addition to the specified package based at least in part on the specified package being configured to be non-trimmable. In accordance with this example, configuration logic 610 may configure the second app version 638 to include the dependencies of the specified package in addition to the specified package in response to receipt of a configuration instruction from determination logic 612. For instance, the configuration instruction may instruct configuration logic 610 to include the dependencies of the specified package along with the specified package in the second app version 638. Accordingly, configuration logic 610 may configure the second app version 638 to include the dependencies of the specified package in addition to the specified package based at least in part on the configuration instruction instructing configuration logic 610 to include the dependencies of the specified package along with the specified package in the second app version 638.

In still another example embodiment, starting the first traversal at the package root(s) in step 502 includes starting the first traversal at multiple package roots. In accordance with this embodiment, the method of flowchart 500 further includes performing a union with regard to results of the first traversal to distinguish between the first subset of the packages and the second subset of the packages. It will be recognized from set theory that a union of multiple sets is the set obtained by combining the members of each. In one example, initiation logic 606 may perform the union with regard to the results of the first traversal to enable the first subset of the packages 634 to be distinguished from the second subset of the packages 634.

In another example embodiment, starting the second traversal at the module root(s) in step 504 includes starting the second traversal at multiple module roots. In accordance with this embodiment, the method of flowchart 500 further includes performing a union with regard to results of the second traversal to distinguish between the first subset of the modules and the second subset of the modules. For instance, initiation logic 606 may perform the union with regard to the results of the second traversal to enable the first subset of the modules 636 to be distinguished from the second subset of the modules 636.

It will be recognized that computing system 600 may not include one or more of graph-based trimming logic 602, store 604, initiation logic 606, distinguishing logic 608, configuration logic 610, determination logic 612, manifest logic 614, and/or definition logic 616. Furthermore, computing system 600 may include components in addition to or in lieu of graph-based trimming logic 602, store 604, initiation logic 606, distinguishing logic 608, configuration logic 610, determination logic 612, manifest logic 614, and/or definition logic 616.

Any one or more of user systems 102A-102M, any one or more of servers 106A-106N, graph-based trimming logic 108, graph-based trimming logic 602, initiation logic 606, distinguishing logic 608, configuration logic 610, determination logic 612, manifest logic 614, definition logic 616, and/or flowchart 500 may be implemented in hardware, software, firmware, or any combination thereof.

For example, any one or more of user systems 102A-102M, any one or more of servers 106A-106N, graph-based trimming logic 108, graph-based trimming logic 602, initiation logic 606, distinguishing logic 608, configuration logic 610, determination logic 612, manifest logic 614, definition logic 616, and/or flowchart 500 may be implemented, at least in part, as computer program code configured to be executed in one or more processors.

In another example, any one or more of user systems 102A-102M, any one or more of servers 106A-106N, graph-based trimming logic 108, graph-based trimming logic 602, initiation logic 606, distinguishing logic 608, configuration logic 610, determination logic 612, manifest logic 614, definition logic 616, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In an example method, a first traversal of a package graph is initiated that specifies a plurality of packages that are included in a first version of an application that is utilized at compile time of the application, including starting the first traversal at one or more package roots that are included in the plurality of packages. A second traversal of a module graph is initiated that specifies a plurality of modules that are included in the first version of the application, including starting the second traversal at one or more module roots that are included in the plurality of modules. A distinction is made between a first subset of the plurality of packages, which is encountered during the first traversal, and a second subset of the plurality of packages, which is not encountered during the first traversal. A distinction is made between a first subset of the plurality of modules, which is encountered during the second traversal, and a second subset of the plurality of modules, which is not encountered during the second traversal. A second version of the application is configured to be utilized at deployment time of the application. The second version includes the first subset of the plurality of packages and does not include the second subset of the plurality of packages. The second version includes the first subset of the plurality of modules and does not include the second subset of the plurality of modules.

In a first aspect of the example method, the example method comprises alternately performing incremental portions of the first traversal and incremental portions of the second traversal to distinguish between the first subset of the plurality of packages and the second subset of the plurality of packages and to further distinguish between the first subset of the plurality of modules and the second subset of the plurality of modules.

In an example of the first aspect of the example method, a specified incremental portion of the first traversal is based at least in part on a first module that is encountered during a specified incremental portion of the second traversal, the plurality of modules including the first module.

In a first implementation of this example, alternately performing the incremental portions of the first traversal and the incremental portions of the second traversal comprises initiating the specified incremental portion of the first traversal at a designated package, which is included in the first subset of the plurality of packages, based at least in part on the designated package including the first module.

In a second implementation of this example, a designated incremental portion of the second traversal, which is performed in response to the specified incremental portion of the first traversal, is based at least in part on a designated module in the first subset of the plurality of modules being included in a designated package that is encountered during the specified incremental portion of the first traversal, the first subset of the plurality of packages including the designated package.

In an example of the second implementation, alternately performing the incremental portions of the first traversal and the incremental portions of the second traversal comprises initiating the designated incremental portion of the second traversal at the designated module based at least in part on the designated module being included in the designated package.

In a third implementation of this example, a designated incremental portion of the first traversal is based at least in part on a second module that is encountered during a designated incremental portion of the second traversal, the plurality of modules including the second module. In accordance with the third implementation, the first module references the second module in the module graph.

In a second aspect of the example method, the example method further comprises determining that a designated module of the plurality of modules is a dynamic dependency of the first version of the application. In accordance with the second aspect, distinguishing between the first subset of the plurality of modules and the second subset of the plurality of modules comprises including the designated module and one or more other modules, which are dependencies of the designated module and which are not referenced by the first version of the application, in the first subset of the plurality of modules in response to determining that the designated module is a dynamic dependency of the first version of the application. The second aspect of the example method may be implemented in combination with the first aspect of the example method, though the example embodiments are not limited in this respect.

In a third aspect of the example method, configuring the second version of the application comprises configuring the second version of the application to be utilized at deployment time of the application in a development environment and at deployment time of the application in a production environment. The third aspect of the example method may be implemented in combination with the first and/or second aspect of the example method, though the example embodiments are not limited in this respect.

In a fourth aspect of the example method, the example method further comprises performing the first traversal of the package graph and the second traversal of the module graph without utilizing feedback from runtime of the application to development of the application. The fourth aspect of the example method may be implemented in combination with the first, second, and/or third aspect of the example method, though the example embodiments are not limited in this respect.

In a fifth aspect of the example method, the example method further comprises utilizing a manifest that indicates the first subset of the plurality of packages and not the second subset of the plurality of packages and that further indicates the first subset of the plurality of modules and not the second subset of the plurality of modules at debug time of the application. The fifth aspect of the example method may be implemented in combination with the first, second, third, and/or fourth aspect of the example method, though the example embodiments are not limited in this respect.

In a sixth aspect of the example method, initiating the second traversal of the module graph comprises initiating the second traversal of the module graph, which does not specify a designated module that is included in the first version of the application. In accordance with the sixth aspect, configuring the second version of the application comprises configuring the second version of the application to include the designated module based at least in part on the designated module being included in at least one package that is included in the first subset of the plurality of packages. The sixth aspect of the example method may be implemented in combination with the first, second, third, fourth, and/or fifth aspect of the example method, though the example embodiments are not limited in this respect.

In a seventh aspect of the example method, the example method further comprises defining a meta-package, which is a user-identifiable container that references the plurality of packages that are included in the first version of the application, to be trimmable to enable the meta-package to be excluded from the second version of the application. The seventh aspect of the example method may be implemented in combination with the first, second, third, fourth, fifth, and/or sixth aspect of the example method, though the example embodiments are not limited in this respect.

In an eighth aspect of the example method, the example method further comprises initially defining the plurality of packages to be in a trimmed state to indicate that the plurality of packages are not to be included in the second version of the application. In accordance with the eighth aspect, the example method further comprises selectively changing a state of each package in at least a subset of the plurality of packages from the trimmed state to an untrimmed state depending on whether the respective package is encountered during the first traversal of the package graph. The untrimmed state indicates that the respective package is to be included in the second version of the application. The eighth aspect of the example method may be implemented in combination with the first, second, third, fourth, fifth, sixth, and/or seventh aspect of the example method, though the example embodiments are not limited in this respect.

In a ninth aspect of the example method, the example method further comprises converting a specified package of the plurality of packages from a default state in which the specified package is non-trimmable such that the specified package is not capable of being excluded from the second version of the application to an updated state in which the specified package is trimmable to enable the specified package to be excluded from the second version of the application, in response to receipt of a user instruction specifying that the specified package is to be trimmable. The ninth aspect of the example method may be implemented in combination with the first, second, third, fourth, fifth, sixth, seventh, and/or eighth aspect of the example method, though the example embodiments are not limited in this respect.

In a tenth aspect of the example method, the example method further comprises converting a designated module of the plurality of modules from a default state in which the designated module is non-trimmable such that the designated module is not capable of being excluded from the second version of the application to an updated state in which the designated module is trimmable to enable the designated module to be excluded from the second version of the application, in response to receipt of a user instruction specifying that the designated module is to be trimmable. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the example method further comprises determining that a specified package of the plurality of packages is configured to be non-trimmable such that the specified package is not capable of being excluded from the second version of the application. In accordance with the eleventh aspect, the example method further comprises identifying dependencies of the specified package. In further accordance with the eleventh aspect, configuring the second version of the application comprises configuring the second version of the application to include the dependencies of the specified package in addition to the specified package based at least in part on the specified package being configured to be non-trimmable. The eleventh aspect of the example method may be implemented in combination with the first, second, third, fourth, fifth, sixth, seventh, eighth, ninth, and/or tenth aspect of the example method, though the example embodiments are not limited in this respect.

In a twelfth aspect of the example method, starting the first traversal at the one or more package roots comprises starting the first traversal at a plurality of package roots. In accordance with the twelfth aspect, the example method further comprises performing a union with regard to results of the first traversal to distinguish between the first subset of the plurality of packages and the second subset of the plurality of packages. The twelfth aspect of the example method may be implemented in combination with the first, second, third, fourth, fifth, sixth, seventh, eighth, ninth, tenth, and/or eleventh aspect of the example method, though the example embodiments are not limited in this respect.

In a thirteenth aspect of the example method, starting the second traversal at the one or more module roots comprises starting the second traversal at a plurality of module roots. In accordance with the thirteenth aspect, the example method further comprises performing a union with regard to results of the second traversal to distinguish between the first subset of the plurality of modules and the second subset of the plurality of modules. The thirteenth aspect of the example method may be implemented in combination with the first, second, third, fourth, fifth, sixth, seventh, eighth, ninth, tenth, eleventh, and/or twelfth aspect of the example method, though the example embodiments are not limited in this respect.

An example system comprises traversal logic configured to initiate a first traversal of a package graph that specifies a plurality of packages that are included in a first version of an application that is utilized at compile time of the application, including starting the first traversal at one or more package roots that are included in the plurality of packages. The traversal logic is further configured to initiate a second traversal of a module graph that specifies a plurality of modules that are included in the first version of the application, including starting the second traversal at one or more module roots that are included in the plurality of modules. The example system further comprises distinguishing logic configured to distinguish between a first subset of the plurality of packages, which is encountered during the first traversal, and a second subset of the plurality of packages, which is not encountered during the first traversal. The distinguishing logic is further configured to distinguish between a first subset of the plurality of modules, which is encountered during the second traversal, and a second subset of the plurality of modules, which is not encountered during the second traversal. The example method further comprises configuration logic to configure a second version of the application to be utilized at deployment time of the application. The second version includes the first subset of the plurality of packages and does not include the second subset of the plurality of packages. The second version includes the first subset of the plurality of modules and does not include the second subset of the plurality of modules.

In a first aspect of the example system, the traversal logic is configured to alternately perform incremental portions of the first traversal and incremental portions of the second traversal to enable the first subset of the plurality of packages to be distinguished from the second subset of the plurality of packages and to further enable the first subset of the plurality of modules to be distinguished from the second subset of the plurality of modules.

In an example of the first aspect of the example system, the traversal logic is configured to perform a specified incremental portion of the first traversal based at least in part on a first module that is encountered during a specified incremental portion of the second traversal, the plurality of modules including the first module.

In a first implementation of this example, the traversal logic is configured to initiate the specified incremental portion of the first traversal at a designated package, which is included in the first subset of the plurality of packages, based at least in part on the designated package including the first module.

In a second implementation of this example, the traversal logic is configured to perform a designated incremental portion of the second traversal, in response to the specified incremental portion of the first traversal, based at least in part on a designated module in the first subset of the plurality of modules being included in a designated package that is encountered during the specified incremental portion of the first traversal, the first subset of the plurality of packages including the designated package.

In an example of the second implementation, the traversal logic is configured to initiate the designated incremental portion of the second traversal at the designated module based at least in part on the designated module being included in the designated package.

In a third implementation of this example, a designated incremental portion of the first traversal is based at least in part on a second module that is encountered during a designated incremental portion of the second traversal, the plurality of modules including the second module. In accordance with the third implementation, the first module references the second module in the module graph.

In a second aspect of the example system, the example system further comprises determination logic configured to determine whether a designated module of the plurality of modules is a dynamic dependency of the first version of the application. In accordance with the second aspect, the distinguishing logic is configured to include the designated module and one or more other modules, which are dependencies of the designated module and which are not referenced by the first version of the application, in the first subset of the plurality of modules in response to a determination that the designated module is a dynamic dependency of the first version of the application. The second aspect of the example system may be implemented in combination with the first aspect of the example system, though the example embodiments are not limited in this respect.

In a third aspect of the example system, the configuration logic is to configure the second version of the application to be utilized at deployment time of the application in a development environment and at deployment time of the application in a production environment. The third aspect of the example system may be implemented in combination with the first and/or second aspect of the example system, though the example embodiments are not limited in this respect.

In a fourth aspect of the example system, the example system further comprises the traversal logic is configured to perform the first traversal of the package graph and the second traversal of the module graph without utilizing feedback from runtime of the application to development of the application. The fourth aspect of the example system may be implemented in combination with the first, second, and/or third aspect of the example system, though the example embodiments are not limited in this respect.

In a fifth aspect of the example system, the example system further comprises manifest logic configured to utilize a manifest that indicates the first subset of the plurality of packages and not the second subset of the plurality of packages and that further indicates the first subset of the plurality of modules and not the second subset of the plurality of modules to debug the application. The fifth aspect of the example system may be implemented in combination with the first, second, third, and/or fourth aspect of the example system, though the example embodiments are not limited in this respect.

In a sixth aspect of the example system, the module graph does not specify a designated module that is included in the first version of the application. In accordance with the sixth aspect, the configuration logic is to configure the second version of the application to include the designated module based at least in part on the designated module being included in at least one package that is included in the first subset of the plurality of packages. The sixth aspect of the example system may be implemented in combination with the first, second, third, fourth, and/or fifth aspect of the example system, though the example embodiments are not limited in this respect.

In a seventh aspect of the example system, the example system further comprises definition logic configured to define a meta-package, which is a user-identifiable container that references the plurality of packages that are included in the first version of the application, to be trimmable to enable the meta-package to be excluded from the second version of the application. The seventh aspect of the example system may be implemented in combination with the first, second, third, fourth, fifth, and/or sixth aspect of the example system, though the example embodiments are not limited in this respect.

In an eighth aspect of the example system, the example system further comprises definition logic configured to initially define the plurality of packages to be in a trimmed state to indicate that the plurality of packages are not to be included in the second version of the application. In accordance with the eighth aspect, the definition logic is further configured to selectively change a state of each package in at least a subset of the plurality of packages from the trimmed state to an untrimmed state depending on whether the respective package is encountered during the first traversal of the package graph. The untrimmed state indicates that the respective package is to be included in the second version of the application. The eighth aspect of the example system may be implemented in combination with the first, second, third, fourth, fifth, sixth, and/or seventh aspect of the example system, though the example embodiments are not limited in this respect.

In a ninth aspect of the example system, the example system further comprises definition logic configured to convert a specified package of the plurality of packages from a default state in which the specified package is non-trimmable such that the specified package is not capable of being excluded from the second version of the application to an updated state in which the specified package is trimmable to enable the specified package to be excluded from the second version of the application, in response to receipt of a user instruction specifying that the specified package is to be trimmable. The ninth aspect of the example system may be implemented in combination with the first, second, third, fourth, fifth, sixth, seventh, and/or eighth aspect of the example system, though the example embodiments are not limited in this respect.

In a tenth aspect of the example system, the example system further comprises definition logic configured to convert a designated module of the plurality of modules from a default state in which the designated module is non-trimmable such that the designated module is not capable of being excluded from the second version of the application to an updated state in which the designated module is trimmable to enable the designated module to be excluded from the second version of the application, in response to receipt of a user instruction specifying that the designated module is to be trimmable. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the example system further comprises determination logic configured to determine whether a specified package of the plurality of packages is configured to be non-trimmable such that the specified package is not capable of being excluded from the second version of the application. In accordance with the eleventh aspect, the distinguishing logic is configured to identify dependencies of the specified package. In further accordance with the eleventh aspect, the configuration logic is to configure the second version of the application to include the dependencies of the specified package in addition to the specified package based at least in part on the specified package being configured to be non-trimmable. The eleventh aspect of the example system may be implemented in combination with the first, second, third, fourth, fifth, sixth, seventh, eighth, ninth, and/or tenth aspect of the example system, though the example embodiments are not limited in this respect.

In a twelfth aspect of the example system, the one or more package roots include a plurality of package roots. In accordance with the twelfth aspect, the traversal logic is configured to perform a union with regard to results of the first traversal to enable the first subset of the plurality of packages to be distinguished from the second subset of the plurality of packages. The twelfth aspect of the example system may be implemented in combination with the first, second, third, fourth, fifth, sixth, seventh, eighth, ninth, tenth, and/or eleventh aspect of the example system, though the example embodiments are not limited in this respect.

In a thirteenth aspect of the example system, the one or more module roots include a plurality of module roots. In accordance with the thirteenth aspect, the example system further comprises the traversal logic is configured to perform a union with regard to results of the second traversal to enable the first subset of the plurality of modules to be distinguished from the second subset of the plurality of modules. The thirteenth aspect of the example system may be implemented in combination with the first, second, third, fourth, fifth, sixth, seventh, eighth, ninth, tenth, eleventh, and/or twelfth aspect of the example system, though the example embodiments are not limited in this respect.

An example computer program product comprises a computer-readable storage medium having instructions recorded thereon for enabling a processor-based system to trim unused dependencies using a package graph and a module graph. The instructions comprise first instructions for enabling the processor-based system to initiate a first traversal of a package graph that specifies a plurality of packages that are included in a first version of an application that is utilized at compile time of the application, including starting the first traversal at one or more package roots that are included in the plurality of packages. The first instructions are further for enabling the processor-based system to initiate a second traversal of a module graph that specifies a plurality of modules that are included in the first version of the application, including starting the second traversal at one or more module roots that are included in the plurality of modules. The instructions further comprise second instructions for enabling the processor-based system to distinguish between a first subset of the plurality of packages, which is encountered during the first traversal, and a second subset of the plurality of packages, which is not encountered during the first traversal. The second instructions are further for enabling the processor-based system to distinguish between a first subset of the plurality of modules, which is encountered during the second traversal, and a second subset of the plurality of modules, which is not encountered during the second traversal. The instructions further comprise third instructions for enabling the processor-based system to configure a second version of the application to be utilized at deployment time of the application. The second version includes the first subset of the plurality of packages and does not include the second subset of the plurality of packages. The second version includes the first subset of the plurality of modules and does not include the second subset of the plurality of modules.

IV. Example Computer System

Figure 7:
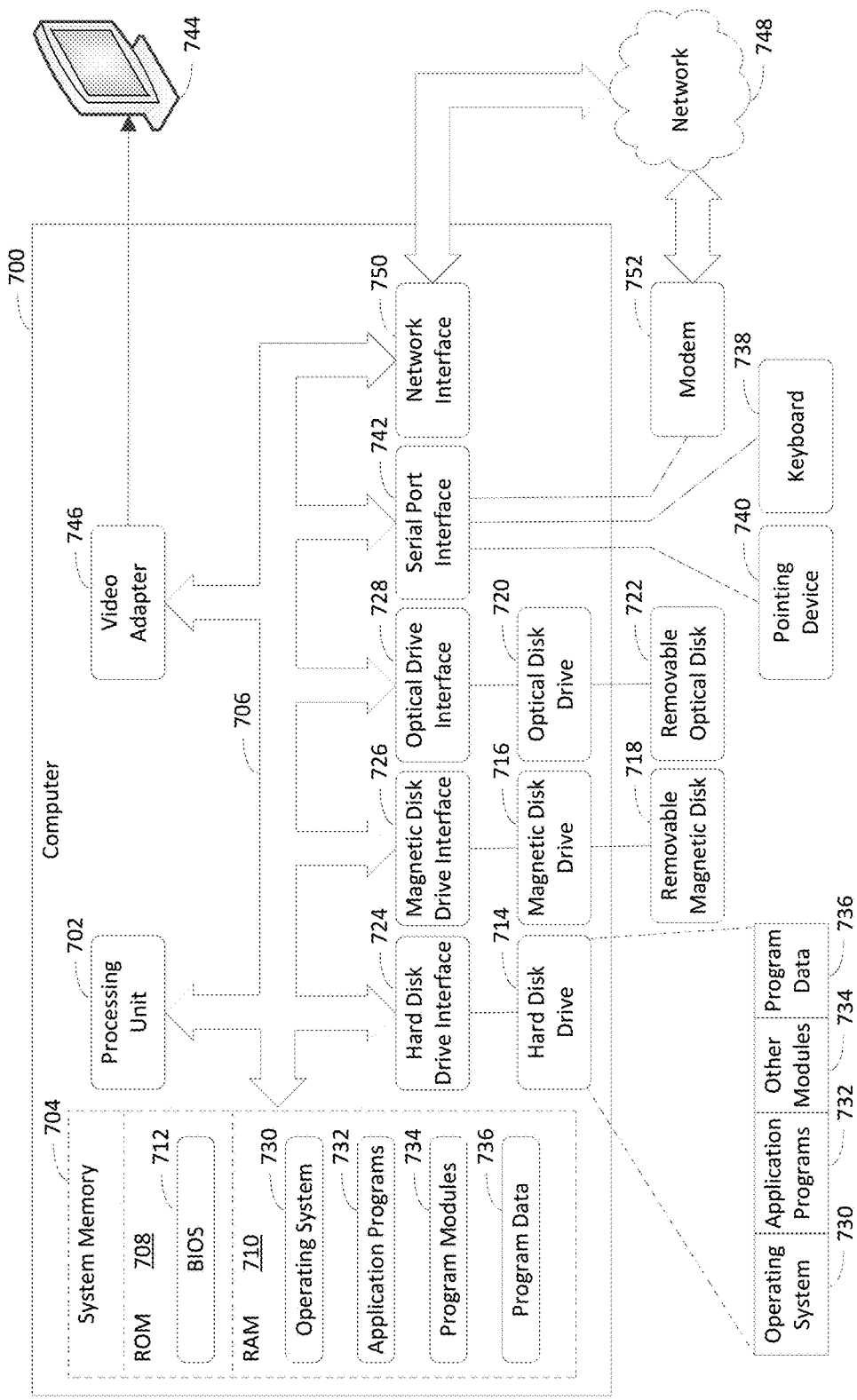
FIG. 7 depicts an example computer in which embodiments may be implemented.

FIG. 7 depicts an example computer 700 in which embodiments may be implemented. Any one or more of user systems 102A-102M and/or any one or more of file servers 106A-106N shown in FIG. 1 and/or computing system 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of graph-based trimming logic 108, graph-based trimming logic 602, initiation logic 606, distinguishing logic 608, configuration logic 610, determination logic 612, manifest logic 614, definition logic 616, and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   one or more processors coupled to the memory, the one or more processors configured to:
   reduce at least one of an amount of time or an amount of resources that is used to trim unused dependencies by performing at least the following operations:
   initiate a first traversal of a package graph that specifies a plurality of packages that are included in a first version of an application that is utilized at compile time of the application, including starting the first traversal at one or more package roots that are included in the plurality of packages;
   initiate a second traversal of a module graph that specifies a plurality of modules that are included in the first version of the application, including starting the second traversal at one or more module roots that are included in the plurality of modules;
   distinguish between a first subset of the plurality of packages, which is encountered during the first traversal, and a second subset of the plurality of packages, which is not encountered during the first traversal;
   distinguish between a first subset of the plurality of modules, which is encountered during the second traversal, and a second subset of the plurality of modules, which is not encountered during the second traversal; and
   configure a second version of the application to be utilized at deployment time of the application, the second version including the first subset of the plurality of packages and not including the second subset of the plurality of packages, the second version including the first subset of the plurality of modules and not including the second subset of the plurality of modules;
   wherein the one or more processors are configured to alternately perform incremental portions of the first traversal and incremental portions of the second traversal.

2. The system of claim 1, wherein the one or more processors are configured to alternately perform the incremental portions of the first traversal and the incremental portions of the second traversal to enable the first subset of the plurality of packages to be distinguished from the second subset of the plurality of packages and to further enable the first subset of the plurality of modules to be distinguished from the second subset of the plurality of modules.

3. The system of claim 1, wherein the one or more processors are configured to perform a specified incremental portion of the first traversal based at least in part on a first module that is encountered during a specified incremental portion of the second traversal, the plurality of modules including the first module.

4. The system of claim 3, wherein the one or more processors are configured to initiate the specified incremental portion of the first traversal at a designated package, which is included in the first subset of the plurality of packages, based at least in part on the designated package including the first module.

5. The system of claim 3, wherein the one or more processors are configured to perform a designated incremental portion of the second traversal, in response to the specified incremental portion of the first traversal, based at least in part on a designated module in the first subset of the plurality of modules being included in a designated package that is encountered during the specified incremental portion of the first traversal, the first subset of the plurality of packages including the designated package.

6. The system of claim 5, wherein the one or more processors are configured to initiate the designated incremental portion of the second traversal at the designated module based at least in part on the designated module being included in the designated package.

7. The system of claim 3, wherein a designated incremental portion of the first traversal is based at least in part on a second module that is encountered during a designated incremental portion of the second traversal, the plurality of modules including the second module; and wherein the first module references the second module in the module graph.

8. The system of claim 1, wherein the module graph does not specify a designated module that is included in the first version of the application; and wherein the one or more processors are to configure the second version of the application to include the designated module based at least in part on the designated module being included in at least one package that is included in the first subset of the plurality of packages.

9. The system of claim 1, wherein the one or more processors are configured to define a meta-package, which is a user-identifiable container that references the plurality of packages that are included in the first version of the application, to be trimmable to enable the meta-package to be excluded from the second version of the application.

10. The system of claim 1, wherein the one or more processors are configured to convert a designated module of the plurality of modules from a default state in which the designated module is non-trimmable such that the designated module is not capable of being excluded from the second version of the application to an updated state in which the designated module is trimmable to enable the designated module to be excluded from the second version of the application, in response to receipt of a user instruction specifying that the designated module is to be trimmable.

11. The system of claim 1, wherein the one or more processors are configured to:

determine whether a specified package of the plurality of packages is configured to be non-trimmable such that the specified package is not capable of being excluded from the second version of the application;

identify dependencies of the specified package; and configure the second version of the application to include the dependencies of the specified package in addition to the specified package based at least in part on the specified package being configured to be non-trimmable.

12. The system of claim 1, wherein the one or more package roots include a plurality of package roots;

wherein the one or more processors are configured to perform a union with regard to results of the first traversal to enable the first subset of the plurality of packages to be distinguished from the second subset of the plurality of packages.

13. A method comprising:

reducing at least one of an amount of time or an amount of resources that is used to trim unused dependencies by performing at least the following operations:

initiating a first traversal of a package graph that specifies a plurality of packages that are included in a first version of an application that is utilized at compile time of the application, including starting the first traversal at one or more package roots that are included in the plurality of packages;

initiating a second traversal of a module graph that specifies a plurality of modules that are included in the first version of the application, including starting the second traversal at one or more module roots that are included in the plurality of modules, wherein incremental portions of the first traversal and incremental portions of the second traversal are alternately performed;

distinguishing between a first subset of the plurality of packages, which is encountered during the first traversal, and a second subset of the plurality of packages, which is not encountered during the first traversal;

distinguishing between a first subset of the plurality of modules, which is encountered during the second traversal, and a second subset of the plurality of modules, which is not encountered during the second traversal; and configuring a second version of the application to be utilized at deployment time of the application, the second version including the first subset of the plurality of packages and not including the second subset of the plurality of packages, the second version including the first subset of the plurality of modules and not including the second subset of the plurality of modules.

14. The method of claim 13, comprising:

determining that a designated module of the plurality of modules is a dynamic dependency of the first version of the application;

wherein distinguishing between the first subset of the plurality of modules and the second subset of the plurality of modules comprises:

including the designated module and one or more other modules, which are dependencies of the designated module and which are not referenced by the first version of the application, in the first subset of the plurality of modules in response to determining that the designated module is a dynamic dependency of the first version of the application.

15. The method of claim 13, wherein configuring the second version of the application comprises:

configuring the second version of the application to be utilized at deployment time of the application in a development environment and at deployment time of the application in a production environment.

16. The method of claim 13, comprising:

performing the first traversal of the package graph and the second traversal of the module graph without utilizing feedback from runtime of the application to development of the application.

17. The method of claim 13, comprising:

utilizing a manifest that indicates the first subset of the plurality of packages and not the second subset of the plurality of packages and that further indicates the first subset of the plurality of modules and not the second subset of the plurality of modules at debug time of the application.

18. The method of claim 13, comprising:

initially defining the plurality of packages to be in a trimmed state to indicate that the plurality of packages are not to be included in the second version of the application; and selectively changing a state of each package in at least a subset of the plurality of packages from the trimmed state to an untrimmed state depending on whether the respective package is encountered during the first traversal of the package graph, the untrimmed state indicating that the respective package is to be included in the second version of the application.

19. The method of claim 13, comprising:
converting a specified package of the plurality of packages from a default state in which the specified package is non-trimmable such that the specified package is not capable of being excluded from the second version of the application to an updated state in which the specified package is trimmable to enable the specified package to be excluded from the second version of the application, in response to receipt of a user instruction specifying that the specified package is to be trimmable.

20. The method of claim 13, wherein starting the second traversal at the one or more module roots comprises:
starting the second traversal at a plurality of module roots; and
wherein the method comprises:
performing a union with regard to results of the second traversal to distinguish between the first subset of the plurality of modules and the second subset of the plurality of modules.

21. A computer program product comprising a computer-readable storage medium having instructions recorded thereon for enabling a processor-based system to trim unused dependencies, the instructions for enabling the processor-based system to:
reduce at least one of an amount of time or an amount of resources that is used to trim the unused dependencies by performing at least the following operations:
initiate a first traversal of a package graph that specifies a plurality of packages that are included in a first version of an application that is utilized at compile time of the application, including starting the first traversal at one or more package roots that are included in the plurality of packages;
initiate a second traversal of a module graph that specifies a plurality of modules that are included in the first version of the application, including starting the second traversal at one or more module roots that are included in the plurality of modules wherein incremental portions of the first traversal and incremental portions of the second traversal are alternately performed;
distinguish between a first subset of the plurality of packages, which is encountered during the first traversal, and a second subset of the plurality of packages, which is not encountered during the first traversal;
distinguish between a first subset of the plurality of modules, which is encountered during the second traversal, and a second subset of the plurality of modules, which is not encountered during the second traversal; and
configure a second version of the application to be utilized at deployment time of the application, the second version including the first subset of the plurality of packages and not including the second subset of the plurality of packages, the second version including the first subset of the plurality of modules and not including the second subset of the plurality of modules.

* * * * *